Sept. 16, 1958    E. C. HUGHES ET AL    2,852,693
METHOD AND APPARATUS FOR MEASURING THE OPTICAL
PROPERTIES OF LIQUIDS
Filed Jan. 13, 1953
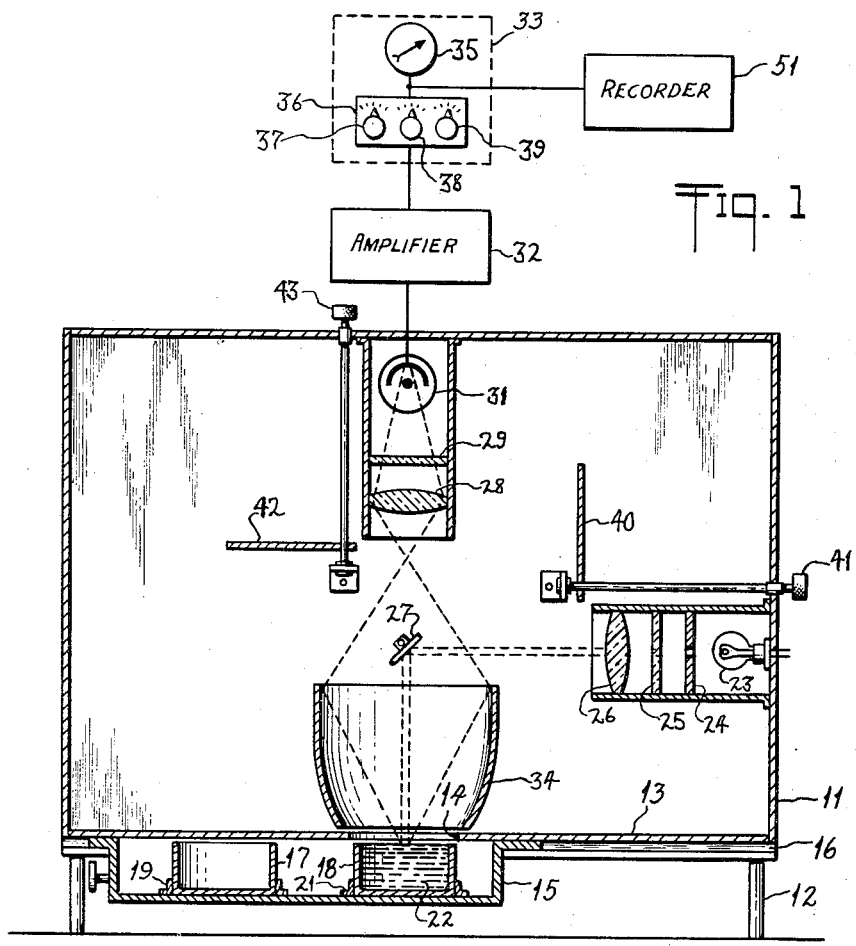
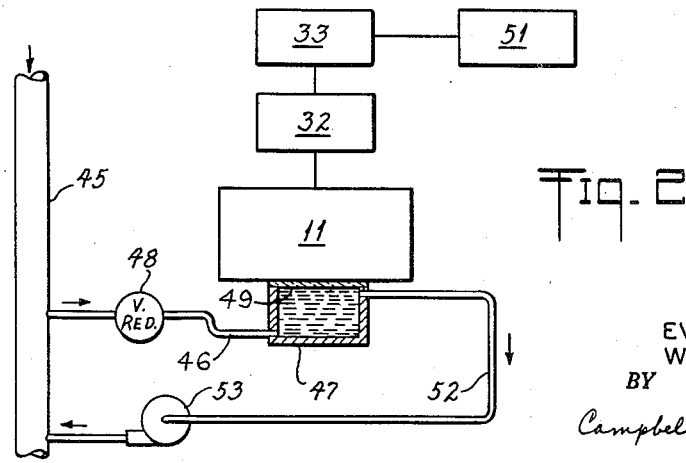
INVENTORS.
EVERETT C. HUGHES
WARREN JACKSON, JR.
BY
Campbell, Brumbaugh, Free + Graves
THEIR ATTORNEYS.

United States Patent Office 2,852,693
Patented Sept. 16, 1958

2,852,693

METHOD AND APPARATUS FOR MEASURING THE OPTICAL PROPERTIES OF LIQUIDS

Everett C. Hughes, Shaker Heights, and Warren Jackson, Jr., Lyndhurst, Ohio, assignors to The Standard Oil Company, Cleveland, Ohio, a corporation of Ohio Application January 13, 1953, Serial No. 331,072

4 Claims. (Cl. 250—71)

This invention relates to the measurement of optical properties of liquids and, more particularly, to the measurement of the surface color of petroleum products.

It is common practice to measure the color of oils by determining their effect on light transmitted therethrough. The transmitted light is primarily a function of the optical density of the liquid and may not correspond to the appearance of the oil to the human eye which perceives primarily the surface color, which is radically affected by "bloom" or fluorescent light emitted from the surface.

The present inventors have found that the surface color of liquids, particularly petroleum products, may be accurately evaluated by measuring only the light that is diffusely reflected and/or emitted from the surface of the liquids. This diffused reflection, as the term is used herein, not only includes incident light that is diffusely reflected but also radiation due to scattering of light, fluorescent and phosphorescent radiation, and similar phenomena.

The present inventors have furthermore found that the direct or specular reflection from the plane surface of the liquid interferes with the color rating of the liquids because its intensity is so much greater than the diffusely reflected light, and should be eliminated from the measurements. Specular reflection is that reflection in which the direction of propagation is sharply defined after reflection, that is, where the angle of incident radiation is equal to the angle of reflected radiation.

It is an object of the present invention to obtain a measurement of the surface appearance of liquids corresponding closely to that perceived by the human eye and which measurement is substantially unaffected by moderate differences in the optical density of the liquids.

It is a further object of the invention to provide a method of and apparatus for obtaining an optical-electrical rating of liquid petroleum products which is correlated with the surface color rating determined by the average human eye.

These and other objects of the invention are attained by irradiating a surface of a liquid with light, intercepting the light that is directly or specularly reflected from the surface, and measuring the intensity of the light diffusely reflected from the liquid as a result of diffused reflection, scattering, fluorescence, phosphorescence, etc.

In a particular embodiment of the invention a polychromatic source of light is filtered, and an optical system is employed for directing the filtered light substantially perpendicularly onto a surface of a liquid. Any light directly reflected from the surface is intercepted and is directed back into the liquid. The light that is diffusely reflected from the surface of the liquid is directed onto a photoelectric device, which provides an electrical signal having an amplitude indicative of the intensity of the light and accordingly a measure of the surface color of the liquid.

In order that the invention may be more fully understood, it will now be described in detail with reference to the accompanying drawings, wherein:

Fig. 1 is a schematic diagram of one embodiment of the invention including a vertical section of the optical portion of the apparatus; and Fig. 2 is a schematic diagram of a continuous measuring and recording system.

Referring now to Fig. 1, a housing 11 supporting the optical and mechanical components of the apparatus for measuring the surface color of liquids is mounted on legs 12. The housing 11 is light-tight with the exception of an opening 14 in its bottom wall 13. This opening is normally covered by a drawer 15 adapted to slide horizontally in guideways 16. Identical cylindrical sample containers 17 and 18 are removably positioned in spaced circular flanges 19 and 21, respectively, on the bottom of the drawer 15.

The sample container 18 is illustrated as entirely filled with a sample liquid 22, which presents an exposed upper surface visible through the opening 14 when the drawer 15 is slid into position. The surface of the liquid 22 is illuminated by a beam of light which is generated by a light source 23, such as an incandescent lamp. The light from the source 23 passes through an optical slit 24, which may be of adjustable width, is transmitted by a light filter 25, which eliminates undesired wave lengths, and is collimated by a lens 26. The beam of light is then directed by a mirror 27, which is positioned above the opening 14, to strike the surface of the liquid 22 substantially perpendicularly. Any light that is directly reflected from the liquid surface is intercepted by the mirror 27, is redirected back toward the light source 23. Multiple reflection between the liquid and the source results in eventual absorption of the light in the liquid.

A portion of the incident light is reflected diffusely from the surface of the liquid. A lens 28 is positioned substantially perpendicularly above the surface of the liquid and beyond the mirror 27 to collect at least a portion of this diffusely reflected light and to direct this light through a filter 29 onto a photoelectric device 31, such as a phototube. The photoelectric device 31 generates or controls an electrical signal, whose magnitude is a function of the intensity of the light impinging thereon and which may be measured by an indicating circuit 33 after amplification in an amplifier 32. The signal may be recorded in a conventional recorder 51.

Since the inclusion of the filters 25 and 29 greatly decreases the intensity of the light reaching the photoelectric device 31, it is preferable to provide an additional light gathering element 34 which may take the form of a hollow circular aluminum tube concentrically located above the opening 14 and dimensioned, such as being curved inwardly, to collect over a large solid angle the light diffusely reflected from the surface of the liquid 22.

In order to obtain a photoelectric response corresponding to that of the human eye, the transmission characteristics of the filter 29 are correlated with the sensitivity curve of the photoelectric device 31. For example, since the average humane eye is sensitive to light between the wave lengths from about 3,000 to about 7,000 Angstrom units (A.), when a phototube of the RCA Type 935, which has a spectral response from about 2,000 A. to about 7,000 A., is employed, a Corning No. 3307 Signal Yellow filter transmitting from about 4,000 A. to longer than 7,000 A. provides an over-all response approximating that of the human eye.

When the liquid sample is a petroleum product, and when it is desired to measure the "bloom" or fluorescence of the liquid under daylight illumination, a green tristimulus filter, as specified in the ASTM Standards on Petroleum Products, 1949, App. V., may be employed as the filter 25 when the light source 23 is an incandescent tungsten lamp. This filter modifies the light of a tungsten light to simulate daylight from a north sky source. If daylight is available it may be used instead of the light bulb and filter.

In the particular embodiment of the invention illustrated, the sample containers 17 and 18 are made from black glass and have a depth sufficient to permit liquid therein to absorb an incident beam and thus eliminate any reflection from the bottom of the sample container. Auxiliary containers are preferably provided to permit rapid measurement of different samples.

In the actual operation of the apparatus, the indicating circuit 33 for greatest accuracy preferably employs a null-balancing galvanometer 35 energized by a potentiometer circuit 36 of conventional design. The circuit 36 is provided with a dark current balancing control knob 37, a sensitivity control knob 38 and a calibrated emission dial 39.

The apparatus may be standardized by employing the reflectance standard of the Bureau of Standards (NBS Test 129964).

A rotatable light shutter 40 operated by a knob 41 may be provided between the light source 23 and the opening 14 and a further rotatable shutter 42 operated by a knob 43 may be provided between opening 14 and the photoelectric device 31. These shutters permit calibration of the instrument or removal and insertion of the sample containers when the light source 23 is energized and when the indicating circuit 33 is connected to the photoelectric device 31.

The instrument is allowed to attain a stable temperature with both shutters closed before any measurement is made. In order to compensate the indicating circuit 33 for the unavoidable dark current of the photoelectric device 31, the galvanometer 35 is balanced at zero by means of the dark current balancing control knob 37 with the photoelectric device shutter 42 open and the light shutter 40 closed. If the reflectance standard (not shown) is to be employed, it is made spectrographically clean and placed over the clean sample container 17 in the drawer 15. The sample to be measured is placed in the sample container 18, filling the same level full. The sample container 17 supporting the glass plate is placed in position for measurement by sliding the drawer 15. The light shutter 40 is opened and the emission dial 39 is set to read 20% emission. The photoelectric device shutter 42 is then opened, and the sensitivity control 38 is adjusted to balance the galvanometer 35. The shutter 42 is closed, and the sample container 18 is moved beneath the opening 14 to expose the liquid 22 to the light beam.

After thus standardizing the instrument, the photoelectric device shutter 42 is reopened and the galvanometer 35 is balanced by adjusting the emission dial 39. After recording the reading of the emission dial, both shutters 40 and 42 may be closed, the sample drawer 15 removed and the measurement of a different sample initiated.

Careful tests under identical conditions were made with a large number of observers requested to arrange a group of oils from light to dark. Clear glass bottles of various oils were placed in a random order on a shelf before a black background and were illuminated with ordinary daylight and shielded from any direct sunlight. The average human rating compared very satisfactorily with the surface color measurement obtained by the above-described apparatus. Accordingly, the apparatus is highly effective in rating the surface color of appearance of petroleum products and is of substantial value in maintaining the consistent appearance of the product.

In the petroleum refining industry, it is desirable to monitor the surface color of liquid products in order that the refining or blending process may be suitably controlled to maintain consistent product appearance. In Fig. 2 a system is shown wherein liquid is continuously drawn from a flowing stream 45, its surface color is measured and recorded, and the liquid is returned to the source. The stream 45 may be contained in a pipe which may, for example, serve to conduct the liquid from one stage in the manufacturing or blending process to a subsequent stage. The liquid is withdrawn by a small conduit 46 and supplied to a container 47 somewhere near the bottom thereof. If, as is frequent, the pressure of the liquid in the stream 45 is appreciably greater than atmospheric pressure a reducing valve 48 may be interposed in the conduit 46 in order that the liquid may flow into the container 47 at a lower pressure such as atmospheric pressure. The container 47 generally corresponds to the container 18 shown in Fig. 1. However, an optically pure glass top 49 is adapted to cover the upper surface of the liquid and provide a hermetically sealed enclosure. The housing 11 is disposed above the container 47 and is similar to that shown in Fig. 1. The amplifier 32 is connected to the photoelectric device 31 (Fig. 1) and the output of the amplifier 32 is electrically connected to the indicating circuit 33. An automatic recording device 51 is connected in parallel with the galvanometer 35 shown in Fig. 1. The container 47 is provided with an outlet conduit 52 which is connected to a pump 53. The outlet conduit 52 preferably leads from the top of the container 47 to insure the presence of fresh sample in the top 49. The pump 53 is arranged to raise the pressure of the liquid from the container 47 and return the same to the stream 45 at substantially the stream pressure. Accordingly, the system of Fig. 2 provides a continuous record of the surface color of the liquid and permits one either manually or through automatic controls to maintain consistent product appearance.

It is to be understood that various modifications may be effected in the apparatus without departing from the scope of the invention as defined in the appended claims.

We claim:

1. A method of measuring an optical property of a liquid which fluoresces under visible incident light, comprising irradiating a surface of the liquid with said incident light, eliminating from measurement the light emitted from said surface in directions of specular reflection for said incident light, and measuring by a standard of measure representing the average visual response of the human eye the intensity of the light emitted from said surface in directions of diffuse reflection for said incident light, said measured light including as a primary component the secondary light derived from fluorescence of said liquid.

2. A method of measuring the appearance of a lubricating oil which fluoresces under visible incident light, comprising irradiating a surface of the lubricating oil with said visible incident light, eliminating from measurement the light emitted from said surface in the directions of specular reflection for said incident light, and generating an electrical signal representing the average visual response of the human eye to the intensity of the light emitted from said surface in directions of diffuse reflection for said incident light, said light emitted in said last-named directions including as a primary component the secondary light derived from the fluorescence of said lubricating oil.

3. A method for measuring an optical property for lubricating oil which fluoresces under incident light having the characteristics of north sky daylight, comprising irradiating a surface of the lubricating oil with said incident light, eliminating from the totality of the light that light emitted from said surface in directions of specular reflection for said incident light, and measuring light emitted from said surface in directions of diffuse reflection for said incident light by a standard of measure representing the average visual response of the human eye, said measured light including as a primary component the secondary light derived from fluorescence of said lubricating oil.

4. A method for measuring an optical property for lubricating oil which fluoresces under incident light having the characteristics of north sky daylight, comprising irradiating a surface of the lubricating oil with said incident light, eliminating from the totality of the light that light emitted from said surface in directions of specular reflection for said incident light, and converting the light emitted from said surface in directions of diffuse reflection for said incident light into an electrical signal representing the visual average response of the human eye to the light so converted, said light so converted including as a primary component the secondary light derived from fluorescence of said lubricating oil, said electrical signal providing an indication of the deviation if any from a standard oil sample of said measured oil sample in its daylight appearance to the human eye.

References Cited in the file of this patent

UNITED STATES PATENTS

| | | |
|---|---|---|
| 2,046,714 | Wilson et al. | July 7, 1936 |
| 2,068,476 | Thomas | Jan. 19, 1937 |
| 2,213,138 | Hayward | Aug. 27, 1940 |
| 2,263,108 | Stuart | Nov. 18, 1941 |
| 2,287,808 | Lehde | June 30, 1942 |
| 2,311,101 | Tuttle et al. | Feb. 16, 1943 |

UNITED STATES PATENT OFFICE
CERTIFICATE OF CORRECTION

Patent No. 2,852,693 September 16, 1958

Everett C. Hughes et al.

It is hereby certified that error appears in the printed specification of the above numbered patent requiring correction and that the said Letters Patent should read as corrected below.

Column 5, line 9, for "visual average" read -- average visual --.

Signed and sealed this 25th day of November 1958.

(SEAL)
Attest:

KARL H. AXLINE
Attesting Officer

ROBERT C. WATSON
Commissioner of Patents